Figure 1:
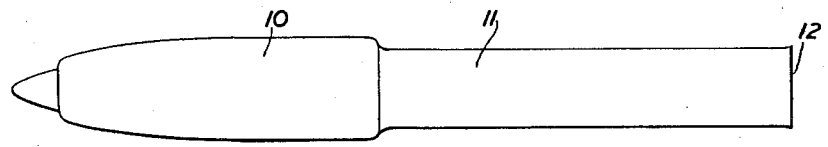

Sept. 11, 1962   F. D. ALLEN ET AL   3,053,283

DUCT ASSEMBLIES

Filed March 2, 1959

INVENTORS
FRANCIS D. ALLEN, CHRISTOPHER M. MILFORD

BY *Holcomb, Wethrill & Brisebois*
ATTORNEYS 3,053,283
Patented Sept. 11, 1962

1

3,053,283
DUCT ASSEMBLIES
Francis Donald Allen, Smallford, near St. Albans, and Christopher Michael Milford, Potters Bar, England, assignors to The De Havilland Engine Company Limited, Leavesden, Hertfordshire, England, a British company
Filed Mar. 2, 1959, Ser. No. 796,436
Claims priority, application Great Britain Mar. 5, 1958
5 Claims. (Cl. 138—111)

This invention relates to duct assemblies such as hot gas ducts and more particularly to duct assemblies comprising inner and outer tubular elements, so dimensioned as to provide a space between the tubular elements and surrounding the inner element through which a cooling fluid can flow.

According to the present invention a duct assembly comprises inner and outer tubular elements so dimensioned as to provide a space between the tubular elements and surrounding the inner element, a first series of two or more circumferentially spaced locating members attached to the outer element and extending inwards into the space between the elements, and a second series of two or more circumferentially spaced locating members attached to the inner element and extending outwards into the space between the elements, and connecting members engaging and connecting together adjacent pairs of members from the two series, these connecting members being formed for engagement with and disengagement from the locating members by longitudinal movement of the connecting members relative to the elements.

A hot gas duct assembly according to the invention might therefore comprise an outer element, and an inner element spaced from the outer element by a space through which cooling fluid can flow, the inner element comprising a series of separate annular sections arranged to provide between their adjacent ends annular passages by which cooling fluid can flow from the space between the elements into the duct within the inner element, and means for supporting the inner element from the outer element comprising a series of circumferentially spaced locating members attached to the outer element adjacent each section of the inner element and extending inwards into the space between the tubes, and a series of circumferentially spaced locating members attached to each annular section of the inner element and extending outwards into the space and connecting members engaging and connecting together the sets of locating members, these connecting members being formed for engagement with and disengagement from the locating members by longitudinal movement of the connecting members relative to the elements.

Preferably each locating member of the first series comprises a part which extends inwards towards the inner tube and has a hook formation adjacent its inner end affording a further part which extends in a tangential direction or outwards away from the inner element, and each locating member of the second series similarly comprises a part which extends generally outwards towards the outer element and has a hook formation adjacent its outer end affording a further part which extends generally in a tangential direction or inwards away from the outer element.

In one preferred embodiment each locating member forms a substantially closed loop providing an aperture when viewed in a direction parallel to the axis of the duct the locating members being so longitudinally spaced on the inner and outer elements and of such radial dimensions that, the aperture of the first series overlap the apertures of the second series of locating members and the connecting members are in the form of rods.

According to another preferred embodiment the connecting members are each substantially straight and are capable of being threaded over or through both sets of locating members to engage the hook formation thereon, and each of the locating members has appreciable length in a longitudinal direction.

Figure 2:
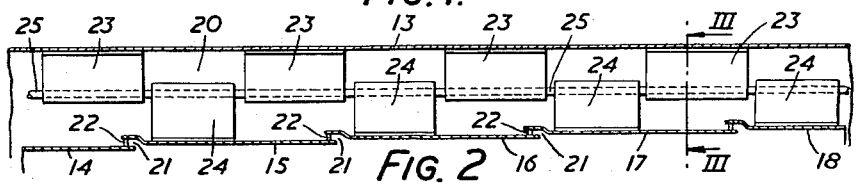
Figure 3:
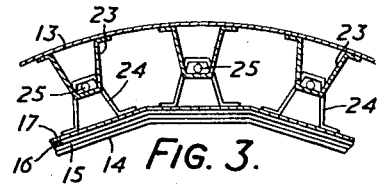
Figure 4:
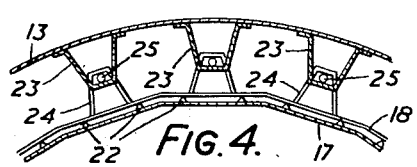
Figure 5:
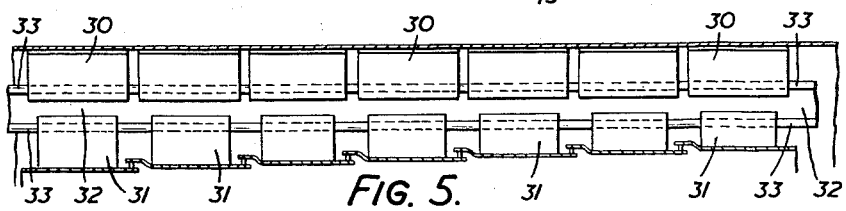
Figure 6:
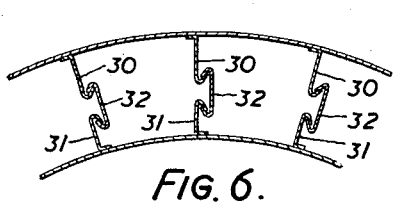
Figure 7:
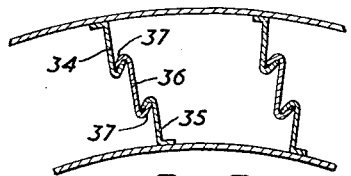
Figure 8:
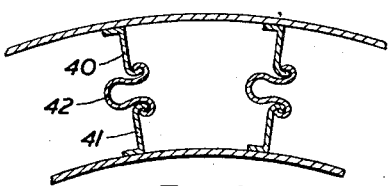
Figure 9:
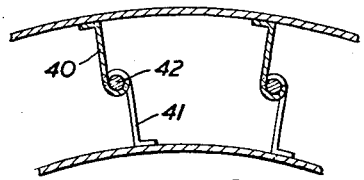
Figure 10:
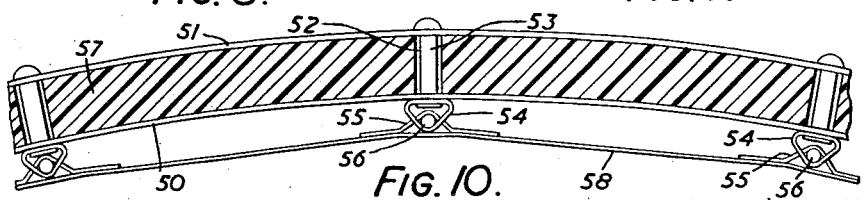

The invention may be performed in various ways and a number of embodiments will be described by way of example with reference to the accompanying drawings in which FIGURE 1 is a general side elevation on a reduced scale of an aircraft gas turbine engine with an exhaust gas duct, FIGURE 2 is a fragmentary sectional side elevation through the wall of the duct, FIGURE 3 is a fragmentary sectional view on the line III—III in FIGURE 2, FIGURE 4 is a sectional view on the line III—III in the opposite downstream direction, FIGURES 5 and 6 are views similar to FIGURES 2 and 4, of a modified construction, FIGURES 7, 8 and 9 are sectional views corresponding to FIGURE 6, of further modified forms of construction, and FIGURE 10 is a view corresponding to FIGURE 4 of another form of the invention incorporating an outer insulating sheath.

In FIGURE 1 the gas turbine engine 10 may be of any known kind and will not be described in detail. The hot exhaust gases therefrom are passed through the duct 11 to an exhaust nozzle 12 to provide jet propulsion, the duct 11 being buried within the aircraft or aircraft wing or in a separate "pod."

Ducts for conveying high temperature gases are commonly provided with a concentric inner element, often referred to as a heatshield, and a cooling fluid may be caused to flow between the inner element and the outer casing, referred to herein as the outer element, for example to reduce the temperature of the inner element. This cooling fluid is usually permitted to enter the duct defined by the inner element at a number of points along the inner element, by forming it from a number of short cylindrical sections assembled in such a way that the upstream end of each section slightly overlaps the downstream end of the section adjacent to it so that cooling fluid can flow through the annular gap thus formed. This has the advantage that it enables a substantially continuous boundary layer of cool fluid to form on the inner surface of the inner element.

The duct assembly illustrated in FIGURES 2, 3, and 4, comprises an outer element or casing 13 and an inner element in the form of a series of separate annular sections 14, 15, 16, 17, 18. The upstream end of each of these sections is of slightly greater diameter than the downstream end and each section overlaps and is spaced by a small radial clearance from the adjacent upstream section to form an annular passage 21 between each pair of sections. These passages provide communication between the annular cooling space 20, situated between the inner and outer elements and the inner duct formed by the inner element. Interrupted spacing members 22 are provided between the overlapping portions of the annular sections and are attached in such a manner as to permit relative movement between the adjacent sections, or alternatively they may be rigid with both.

In the present example each of the annular sections 14, 15, 16, etc. is of slightly greater diameter than its adjacent upstream section to provide an annular cooling space 20 which is of gradually diminishing cross-sectional area as it extends downstream but it will be appreciated that the invention may equally be applied to parallel walled ducts.

The inner element is supported from the outer element by a series of circumferentially spaced locating members 23 attached to the outer element 13 adjacent each annular section of the inner element and extending inwards into the annular cooling space 20, and a series of circumferentially spaced locating members 24 attached to each annular section and extending outwards into the annular space. The locating members are aligned in longitudinally extending rows throughout the length of the duct. Each of the inner and outer locating members 23, 24 is of channel cross section and together with the respective inner or outer element forms a substantially closed loop providing an aperture when viewed in a direction parallel to the axis of the duct. The locating members 23 on the outer element radially overlap and fit between the locating members 24 on the inner element, and a rod-like connecting member 25 is threaded through each longitudinally extending row of overlapping loops to connect the outer and inner elements.

In the present example the locating members 23 on the outer element are of equal radial length throughout the length of the duct but the locating members 24 on the inner element reduce in radial length as the rear of the duct is approached to reduce the effective cross-sectional area of the space 20. The flow of cooling fluid through the annular cooling space 20 will be progressively reduced towards the rear of the duct due to the amount which is allowed to flow into the inner duct through the annular passages 21 between the separate annular sections, the air velocity being maintained as high as possible compatible with as low a pressure loss as can be achieved to maintain fully effective heat exchange with the inner element. In an alternative construction the locating members 24 on the inner element may be of constant radial length and the locating members 23 on the outer element may vary in radial length throughout the length of the duct.

It will be appreciated that the inner and outer elements may be of circular, polygonal or other cross section or a combination of two as in the example illustrated in FIGURES 2, 3 and 4, in which the outer element 13 is of circular cross section and the inner elements 14, 15, 16 etc. polygonal.

In the alternative arrangement illustrated in FIGURES 5 and 6 the inner and outer elements are as described above but the locating members 30, 31, attached respectively to the inner and outer elements, are of hook shaped cross section as seen in FIGURE 6, the "hooks" all being directed in the same circumferential direction, i.e. clockwise in FIGURE 6. These locating members do not overlap radially and are not staggered in an axial direction.

Each pair of adjacent rows of locating members on the inner and outer elements are connected together by a longitudinally extending connecting member 32 which is provided with an inturned lip 33 adjacent to each of its longitudinally extending side edges, these lips engaging the hook like parts on the locating members and acting to hold them in position.

In the further alternative illustrated in FIGURE 7 the locating members 34, 35 are arranged with the hook like parts on adjacent longitudinally extending rows on the inner and outer elements extending in opposite circumferential directions, i.e. clockwise and anti-clockwise, and a connecting member 36 is provided with oppositely bent inturned lips 37 adjacent its longitudinal edges for engagement with the hook like parts on the locating members.

Further possible arrangements are illustrated in FIGURES 8 and 9, where in each case the locating members are indicated by references 40, 41, and the connecting member by reference 42.

The construction illustrated in FIGURE 10 is basically similar to that illustrated in FIGURES 2, 3, and 4, but in this case the outer element 50 is surrounded by an outer jacket 51, positioned by spacer sleeves 52 and rivets 53, and the rivets 53 also act to attach the locating members 54 to the outer element. The locating members 55 are welded to the inner element 58 and the rod-like connecting members 56 are passed through the loops formed by the overlapping members 54, 55. The space between the outer element 50 and the jacket 51 is filled with a thermal insulating material 57.

In all cases where the locating members are provided with hook like portions as opposed to closed loops, and do not overlap radially, each of the outer locating members may extend continuously throughout the longitudinal length of the duct but an interrupted arrangement as described above is preferred to allow for axial thermal expansion.

The method of assembly for all types of construction is similar, the inner and outer elements are placed in position and connected together by longitudinally sliding the connecting member into engagement with the appropriate longitudinally extending rows of locating members.

What we claim as our invention and desire to secure by Letters Patent is:

1. A hot gas duct assembly for a gas turbine engine comprising an outer structure and an inner structure spaced from the outer structure by an annular space, and the inner structure comprising a series of separate annular sections arranged to provide between their adjacent ends annular passages interconnecting the annular space between the structures and the duct within the inner structure, and means for supporting the inner structure from the outer structure comprising a first series of circumferentially spaced locating members attached to the outer structure adjacent each section of the inner structure and extending inwards into the space between the structures, and a second series of circumferentially spaced locating members attached to each annular section of the inner structure and extending outwards into the annular space, and connecting members each extending continuously along substantially the whole length of the duct assembly and engaging and connecting together the sets of locating members, these connecting members being formed for engagement with and disengagement from the locating members by longitudinal movement of the connecting members relative to the structures.

2. A duct assembly as claimed in claim 1 in which each locating member of the first series comprises a part which extends inwards towards the inner structure and has a hook formation adjacent its inner end and each locating member of the second series similarly comprises a part which extends generally outwards towards the outer structure and has a hook formation adjacent its outer end.

3. A duct assembly as claimed in claim 1 in which the locating members are longitudinally spaced on the inner and outer structures, and arranged in longitudinal rows, such that the locating members on the inner and outer structures alternate, and of such radial dimensions that the hook formations on the two series of locating members overlap one another, and the connecting members are in the form of rods of constant cross section.

4. A duct assembly as claimed in claim 2 in which the connecting members are in the form of strip material, the cross section of each connecting member being constant throughout its length and being provided with hook formations at its two opposite edges to engage corresponding formations on the locating members.

5. A hot gas duct assembly for a gas turbine engine as claimed in claim 1, in which each locating member forms with the respective tubular structure a closed loop providing an aperture when viewed in a direction parallel to the longitudinal axis of the duct, and in which the locating members are longitudinally spaced on the inner and outer structures, are arranged in longitudinal rows, in each of which rows the locating members on the inner and outer structures alternate, and in which, in each row, the locating members are of such radial dimensions that the locating members of the first series extend radially inwardly beyond the radially outermost part of the locating members of the second series.

References Cited in the file of this patent

UNITED STATES PATENTS

| | | |
|---|---|---|
| 182,370 | King | Sept. 19, 1876 |
| 566,243 | Svagrovsky | Aug. 18, 1896 |
| 930,012 | Woerner | Aug. 3, 1909 |
| 2,325,616 | Landweber | Aug. 3, 1943 |
| 2,475,635 | Parsons | July 12, 1949 |
| 2,500,501 | Trumpler | Mar. 14, 1950 |
| 2,634,759 | Twickler | Apr. 14, 1953 |
| 2,717,320 | Shoulders et al. | Sept. 6, 1955 |
| 2,759,491 | Everhart | Aug. 21, 1956 |
| 2,785,878 | Conrad | Mar. 19, 1957 |
| 2,795,108 | Saldin | June 11, 1957 |